United States Patent
Ohno et al.

(10) Patent No.: US 12,172,707 B2
(45) Date of Patent: Dec. 24, 2024

(54) POWER STEERING SYSTEM FOR VEHICLE

(71) Applicant: TOYOTA JIDOSHA KABUSHIKI KAISHA, Toyota (JP)

(72) Inventors: Kouhei Ohno, Nagoya (JP); Junko Takao, Kariya (JP); Tatsuya Kawabata, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 17/693,758

(22) Filed: Mar. 14, 2022

(65) Prior Publication Data
US 2022/0297745 A1 Sep. 22, 2022

(30) Foreign Application Priority Data
Mar. 17, 2021 (JP) ................................ 2021-043101

(51) Int. Cl.
*B62D 5/04* (2006.01)
*B62D 7/00* (2006.01)

(52) U.S. Cl.
CPC ............. *B62D 5/0469* (2013.01); *B62D 7/00* (2013.01)

(58) Field of Classification Search
CPC ...... B62D 5/0469; B62D 7/00; B62D 5/0421; B62D 7/08; B62D 5/04; B62D 3/12
USPC ...................................................... 180/444
See application file for complete search history.

(56) References Cited

U.S. PATENT DOCUMENTS

| | | | |
|---|---|---|---|
| 4,522,419 A | 6/1985 | Yoshida et al. | |
| 2013/0119627 A1* | 5/2013 | Tashiro | B62D 7/228 280/93.51 |
| 2013/0161118 A1* | 6/2013 | Yoshimoto | B62D 5/001 180/446 |
| 2020/0290665 A1* | 9/2020 | Toyoda | B62D 5/0424 |
| 2020/0377147 A1* | 12/2020 | Ishihara | B62D 5/0484 |
| 2021/0101637 A1* | 4/2021 | Toyoda | B62D 5/0463 |

FOREIGN PATENT DOCUMENTS

| | | |
|---|---|---|
| CN | 103097230 A | 5/2013 |
| JP | 58-170666 A | 10/1983 |
| JP | 1-156177 A | 6/1989 |
| JP | 2008-56038 A | 3/2008 |

(Continued)

*Primary Examiner* — Scott A Reinbold
(74) *Attorney, Agent, or Firm* — Sughrue Mion, PLLC

(57) ABSTRACT

A power steering system includes a pair of wheel steering mechanisms configured to turn a pair of steered wheels of a vehicle, and a coupling mechanism coupling the steered wheels and coupling the wheel steering mechanisms including operating-side and nonoperating-side mechanisms. The operating-side mechanism includes a drive shaft coupled to one end of the coupling mechanism and extending in an axial direction, and a steering operation member engaged with the drive shaft. The nonoperating-side mechanism includes a drive shaft coupled to the other end of the coupling mechanism and extending in an axial direction, and an electric assist device engaged with the drive shaft. The operating-side mechanism includes at least two operating-side stoppers respectively configured to limit right and left turns of the steered wheels. The nonoperating-side mechanism includes at least one nonoperating-side stopper configured to limit any one of right and left turns of the steered wheels.

6 Claims, 7 Drawing Sheets

(56) References Cited

FOREIGN PATENT DOCUMENTS

| | | | |
|---|---|---|---|
| JP | 2019-038383 | A | 3/2019 |
| JP | 2020-147200 | A | 9/2020 |
| JP | 6839632 | B2 | 2/2021 |
| JP | 2021-059259 | A | 4/2021 |

* cited by examiner

L1a < L2b
L1b < L2a

POWER STEERING SYSTEM FOR VEHICLE

CROSS-REFERENCE TO RELATED APPLICATION

This application claims priority to Japanese Patent Application No. 2021-043101 filed on Mar. 17, 2021, incorporated herein by reference in its entirety.

BACKGROUND

1. Technical Field

The present disclosure relates to a power steering system in a vehicle.

2. Description of Related Art

Japanese Unexamined Patent Application Publication No. 2019-038383 (JP 2019-038383 A) describes a power steering system for a vehicle. The power steering system includes a pair of wheel steering mechanisms that turn a pair of steered wheels of the vehicle, and a coupling mechanism that couples the pair of wheel steering mechanisms and that couples the pair of steered wheels. One of the pair of wheel steering mechanisms is an operating-side wheel steering mechanism including a drive shaft to be moved by an operating torque added to a steering operation member and a driving torque of an electric assist motor. The other one of the pair of wheel steering mechanisms is a nonoperating-side wheel steering mechanism including a drive shaft to be moved by a driving torque of an electric assist motor.

SUMMARY

The present disclosure is capable of appropriately transmitting a limit of a turn of a pair of steered wheels to a steering operation member that can be operated by a driver.

A first aspect of the present disclosure relates to a power steering system for a vehicle. The power steering system includes a pair of wheel steering mechanisms respectively configured to turn a pair of steered wheels of the vehicle, and a coupling mechanism that couples the pair of steered wheels and that couples the pair of wheel steering mechanisms. The pair of wheel steering mechanisms includes an operating-side wheel steering mechanism and a nonoperating-side wheel steering mechanism. The operating-side wheel steering mechanism is provided so as to be coupled to one end of the coupling mechanism and includes a drive shaft extending in an axial direction and a steering operation member engaged with the drive shaft. The nonoperating-side wheel steering mechanism is provided so as to be coupled to the other end of the coupling mechanism and includes a drive shaft extending in an axial direction and an electric assist device engaged with the drive shaft. The operating-side wheel steering mechanism includes at least two operating-side stoppers respectively configured to limit a right turn and a left turn of the pair of steered wheels. The nonoperating-side wheel steering mechanism includes at least one nonoperating-side stopper configured to limit any one of a right turn and a left turn of the pair of steered wheels. Therefore, it is possible to appropriately transmit limitation of each of a right turn and a left turn of the pair of steered wheels to the steering operation member. JP 2019-038383 A is silent about stoppers that limit a turn of a pair of steered wheels.

In the power steering system of the above aspect, the operating-side wheel steering mechanism may include a link mechanism coupling the coupling mechanism and the drive shaft, and the at least two operating-side stoppers may include two operating-side pivot stoppers each configured to be able to contact with a link member that is a component of the link mechanism and configured to limit a pivot of the link member resulting from movement of the drive shaft.

In the power steering system of the above aspect, the operating-side wheel steering mechanism may include a link mechanism coupling the coupling mechanism and the drive shaft, and the at least two operating-side stoppers may include an operating-side movement stopper configured to be able to contact with the drive shaft and configured to limit movement of the drive shaft in a direction to approach the coupling mechanism, and an operating-side pivot stopper configured to be able to contact with a link member that is a component of the link mechanism and configured to limit a pivot of the link member resulting from movement of the drive shaft in a direction to separate from the coupling mechanism.

In the power steering system of the above aspect, the at least two operating-side stoppers may include two operating-side movement stoppers each configured to be able to contact with the drive shaft and configured to limit movement of the drive shaft.

In the power steering system of the above aspect, the nonoperating-side wheel steering mechanism may include a link mechanism coupling the coupling mechanism and the drive shaft, and the at least one nonoperating-side stopper may include a nonoperating-side pivot stopper configured to be able to contact with a link member that is a component of the link mechanism and configured to limit a pivot of the link member resulting from movement of the drive shaft in a direction to approach the coupling mechanism.

In the power steering system of the above aspect, the at least one nonoperating-side stopper may include a nonoperating-side movement stopper configured to be able to contact with the drive shaft and configured to limit movement of the drive shaft in a direction to approach the coupling mechanism.

In the power steering system of the above aspect, the operating-side wheel steering mechanism may further include an electric assist device engaged with the drive shaft.

A second aspect of the present disclosure relates to a power steering system for a vehicle. The power steering system includes a pair of wheel steering mechanisms provided so as to be spaced apart in a right and left direction of the vehicle and respectively configured to turn a pair of steered wheels of the vehicle, a coupling mechanism that couples the pair of steered wheels and that couples the pair of wheel steering mechanisms, at least one first stopper configured to, when the pair of steered wheels is turned to one side in the right and left direction, limit a turn of the pair of steered wheels, and at least two second stoppers configured to, when the pair of steered wheels is turned to the other side in the right and left direction, limit a turn of the pair of steered wheels. The pair of wheel steering mechanisms includes an operating-side wheel steering mechanism and a nonoperating-side wheel steering mechanism. The operating-side wheel steering mechanism is provided on the one side in the right and left direction of the vehicle so as to be coupled to one end of the coupling mechanism and includes a drive shaft extending in an axial direction and a steering operation member engaged with the drive shaft. The nonoperating-side wheel steering mechanism is provided on the other side in the right and left direction of the vehicle so as to be coupled to the other end of the coupling mechanism and includes a drive shaft extending in an axial direction and an electric assist device engaged with the drive shaft.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an example of a power steering system for a vehicle, which is one embodiment of the present disclosure, will be described in detail with reference to the accompanying drawings.

Basic Structure of Power Steering System for Vehicle

Figure 1:
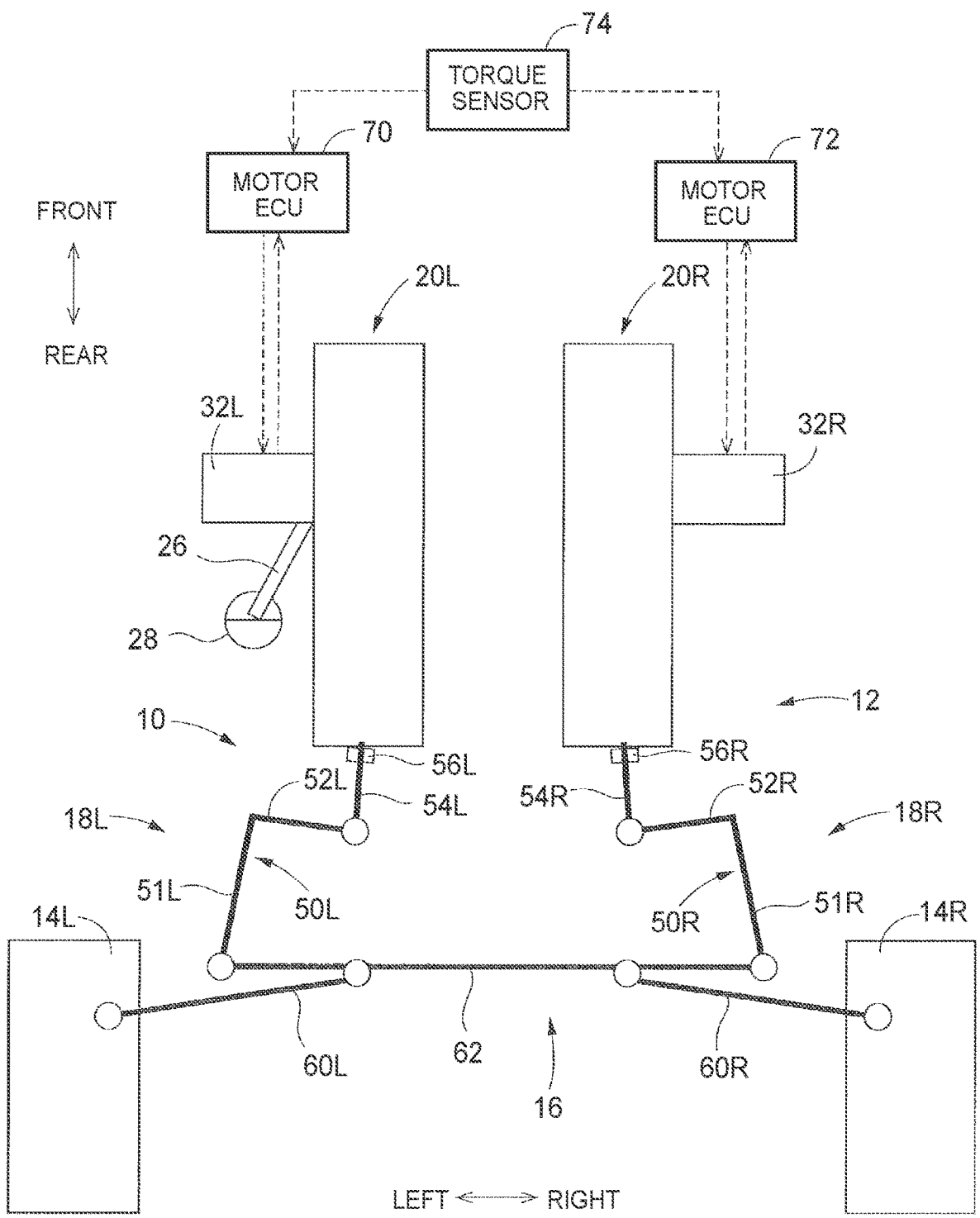
FIG. 1 is a plan view conceptually showing a basic structure of a power steering system for a vehicle.

Initially, the basic structure of the power steering system according to the present disclosure will be described. The basic structure of the power steering system is also a structure common to power steering systems for a vehicle according to a plurality of embodiments described later. As shown in FIG. 1, the power steering system includes a pair of wheel steering mechanisms 10, 12 and a coupling mechanism 16 as a basic structure. The wheel steering mechanisms 10, 12 are provided apart from each other in a width direction (right and left direction) of the vehicle and extend substantially in a front and rear direction. The coupling mechanism 16 couples the wheel steering mechanisms 10, 12 and also couples a pair of steered wheels (for example, right and left front wheels) 14R, 14L provided in the vehicle.

The wheel steering mechanisms 10, 12 are provided in front of the coupling mechanism 16. In the power steering system, the operating-side wheel steering mechanism 10 that is one of the wheel steering mechanisms 10, 12 is provided on the left side of the vehicle, and the nonoperating-side wheel steering mechanism 12 that is the other one of the wheel steering mechanisms 10, 12 is provided on the right side of the vehicle.

Figure 2:
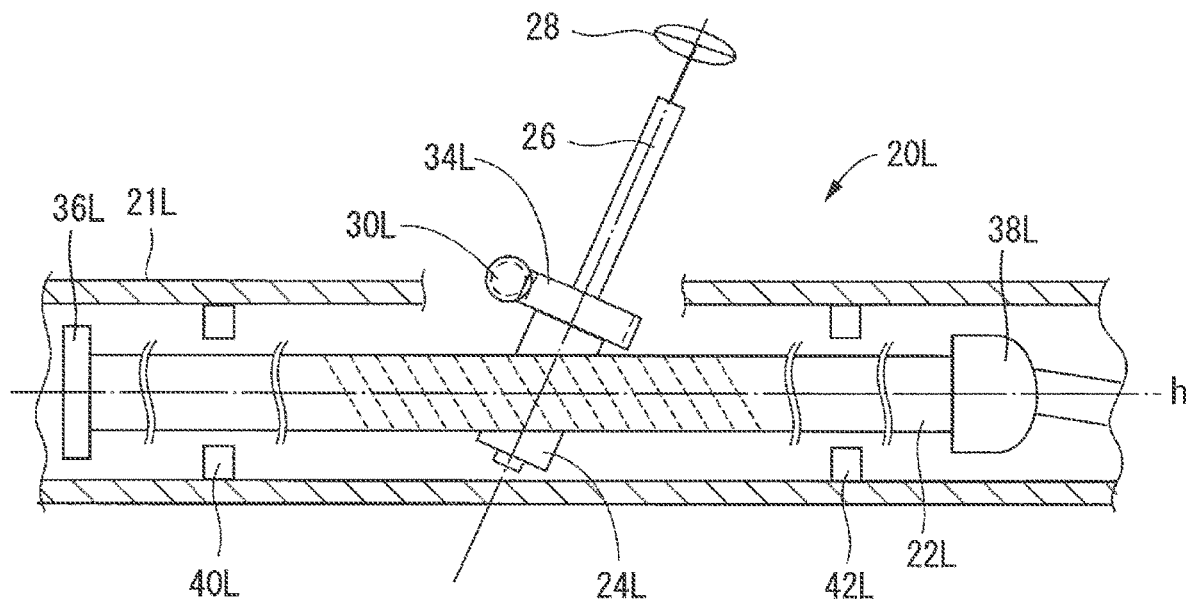
FIG. 2 is a cross-sectional view showing a main part of the basic structure of the power steering system.
Figure 3:
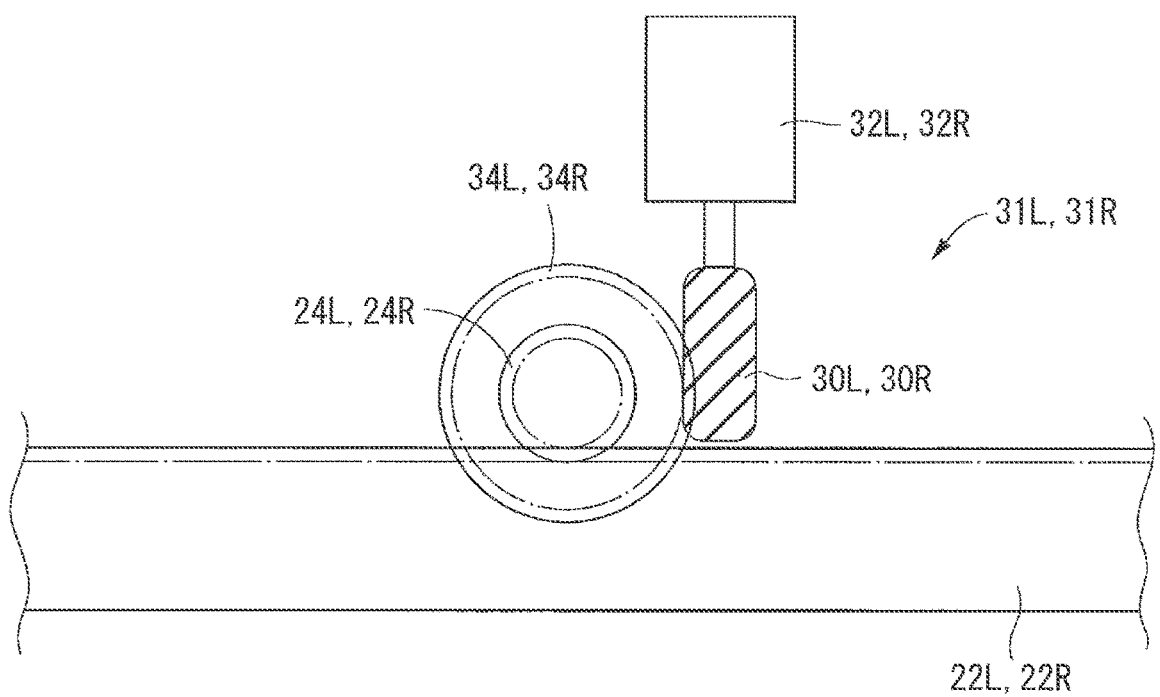
FIG. 3 is a plan view showing the main part.

The operating-side wheel steering mechanism 10 includes a link mechanism 18L and a drive unit 20L. As shown in FIG. 2 and FIG. 3, the drive unit 20L includes a housing 21L, a rack bar 22L serving as a drive shaft, a pinion gear 24L meshed with the teeth of the rack bar 22L, a steering wheel 28 secured to the pinion gear 24L via a steering shaft 26, and an electric assist device 31L.

The electric assist device 31L includes an electric assist motor (hereinafter, simply referred to as assist motor) 32L, a worm gear 30L, and a reduction gear 34L. The worm gear 30L is secured to the output shaft of the assist motor 32L so as to be able to integrally rotate with the output shaft. The reduction gear 34L is provided on the pinion gear 24L so as to be able to integrally rotate with the pinion gear 24L. The reduction gear 34L has a greater diameter than the pinion gear 24L. The worm gear 30L is meshed with the reduction gear 34L.

The rack bar 22L extends in an axial direction to the front and rear direction of the vehicle (in FIG. 2, a direction parallel to an axis h). The rack bar 22L is held on a housing 21L so as to be not rotatable relative to the housing 21L and movable in the axial direction relative to the housing 21L. A front contact portion 36L is provided at the front end of the rack bar 22L. A ball joint 38L having a function as a rear end contact portion is provided at the rear end of the rack bar 22L. In contrast, a front stopper 40L and a rear stopper 42L are provided inside the housing 21L. The front stopper 40L is able to contact with the front contact portion 36L. The ball joint 38L is able to contact with the rear stopper 42L.

The link mechanism 18L includes a first link member 50L and a second link member 54L. The first link member 50L has substantially an L-shape. The second link member 54L extends in substantially a linear shape. The first link member 50L includes a first arm portion 51L and a second arm portion 52L respectively extending in mutually intersecting directions (directions substantially perpendicular to each other). One end of the first link member 50L (an end of the first arm portion 51L) is coupled to one end of the coupling mechanism 16 so as to be pivotable relative to the coupling mechanism 16. The other end of the first link member 50L (an end of the second arm portion 52L) is coupled to one end of the second link member 54L so as to be pivotable relative to the second link member 54L. The other end of the second link member 54L is coupled to the rack bar 22L via the ball joint 38L so as to be pivotable relative to the rack bar 22L. The reference sign 56L indicates an adjustment unit that adjusts the length of the second link member 54L. The reference sign 56R indicates an adjustment unit that adjusts the length of the second link member 54R.

In the basic structure of the power steering system, the nonoperating-side wheel steering mechanism 12 does not include the steering shaft 26 or the steering wheel 28 included in the operating-side wheel steering mechanism 10. However, the other components and structures are the same between the nonoperating-side wheel steering mechanism 12 and the operating-side wheel steering mechanism 10. For this reason, in the drawings, a subscript R is assigned instead of a subscript L for the same components, and the description will not be repeated.

The coupling mechanism 16 includes a pair of tie rods 60R, 60L and a coupling rod 62. The tie rods 60R, 60L are respectively coupled to knuckle arms of right and left front wheels 14R, 14L. The coupling rod 62 couples the tie rods 60R, 60L. One ends of the first link members 50R, 50L (the ends of the first arm portions 51R, 51L) are respectively coupled to both ends of the coupling rod 62 so as to be pivotable relative to the coupling rod 62.

The coupling rod 62 may be coupled to the knuckle arms of the right and left front wheels 14R, 14L, and one ends of the first link members 50R, 50L may be respectively coupled to the tie rods 60R, 60L.

A motor ECU 70 mainly made up of a computer is connected to the assist motor 32L via a drive circuit (not shown). A motor ECU 72 mainly made up of a computer is connected to the assist motor 32R via a drive circuit (not shown). A torque sensor 74 or the like is connected to each of the motor ECUs 70, 72. The torque sensor 74 detects an operating torque added by a driver to the steering wheel 28. The motor ECU 70 controls the assist motor 32L based on the operating torque detected by the torque sensor 74. The motor ECU 72 controls the assist motor 32R based on the operating torque detected by the torque sensor 74. For example, in the motor ECU 70, a target assist force is acquired based on the operating torque detected by the torque sensor 74, a current flowing through the assist motor 32L is detected, a load added to the assist motor 32L is acquired based on the detected current, and an actually output assist force is acquired. In the motor ECU 72, a target assist force is acquired based on the operating torque detected by the torque sensor 74, a current flowing through the assist motor 32R is detected, a load added to the assist motor 32R is acquired based on the detected current, and an actually output assist force is acquired. The assist motors 32R, 32L each are able to be controlled such that the actually output assist force approaches the target assist force.

The assist motor 32L provided in the operating-side wheel steering mechanism 10 and the assist motor 32R provided in the nonoperating-side wheel steering mechanism 12 may be controlled similarly or may be controlled in different modes.

The vehicle power steering system having the thus configured basic structure includes a plurality of stoppers. A right turn and a left turn of the right and left front wheels 14R, 14L are limited by the plurality of stoppers. Hereinafter, the plurality of stoppers will be described in each of a plurality of embodiments.

First Embodiment

Figure 4:
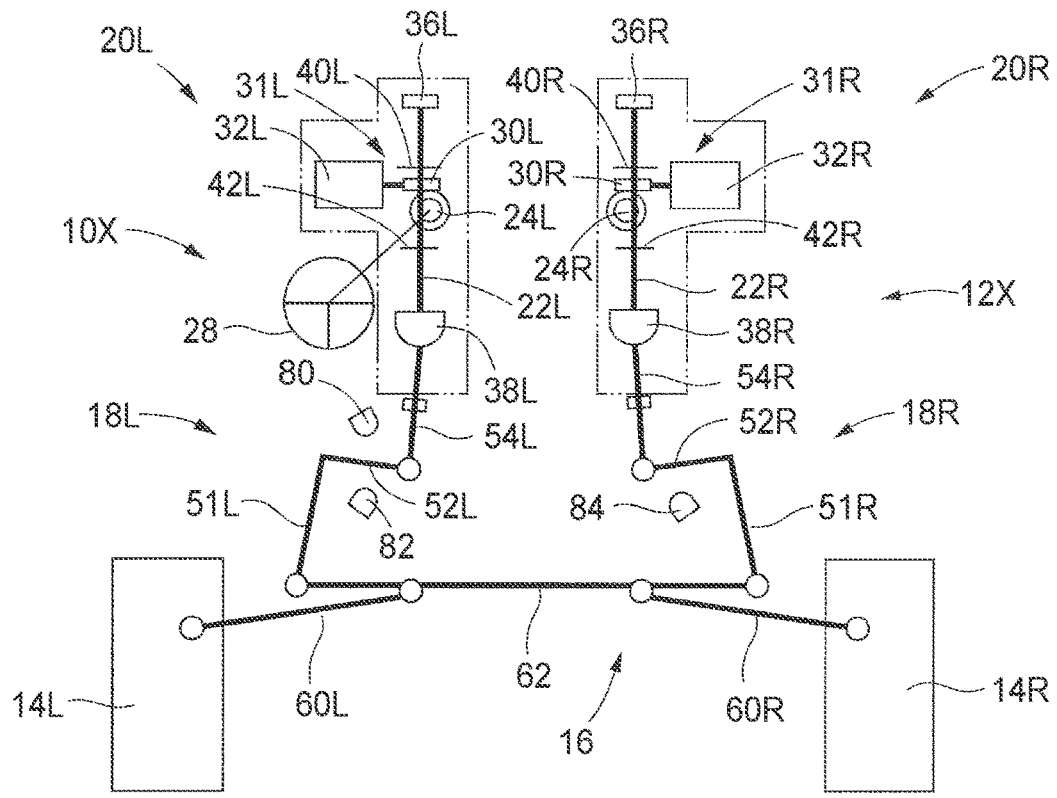
FIG. 4 is a plan view conceptually showing the power steering system according to a first embodiment of the present disclosure.

FIG. 4 shows a vehicle power steering system according to a first embodiment. The vehicle power steering system includes two stop members 80, 82 and one stop member 84. The stop members 80, 82 limit a pivot limit of the link mechanism 18L of an operating-side wheel steering mechanism 10X. The stop member 84 limits a pivot of the link mechanism 18R of a nonoperating-side wheel steering mechanism 12X.

The stop members 80, 82 are mounted at locations of a vehicle body-side member, at which the stop members 80, 82 face the first link member 50L of the link mechanism 18L. As shown in FIG. 4, the stop members 80, 82 are respectively mounted on both sides (front side and rear side) of the second arm portion 52L.

The stop member 84 is mounted on the rear side of the second arm portion 52R of the link mechanism 18R on the vehicle body-side member. The stop member 84 can be mounted at a location substantially bilaterally symmetric to the stop member 82. The vehicle body-side member is a body or a member secured to the body and means a member that does not pivot as a result of a pivot of the link mechanism 18R or the link mechanism 18L or move as a result of movement of the rack bar 22R or the rack bar 22L.

Figure 5:
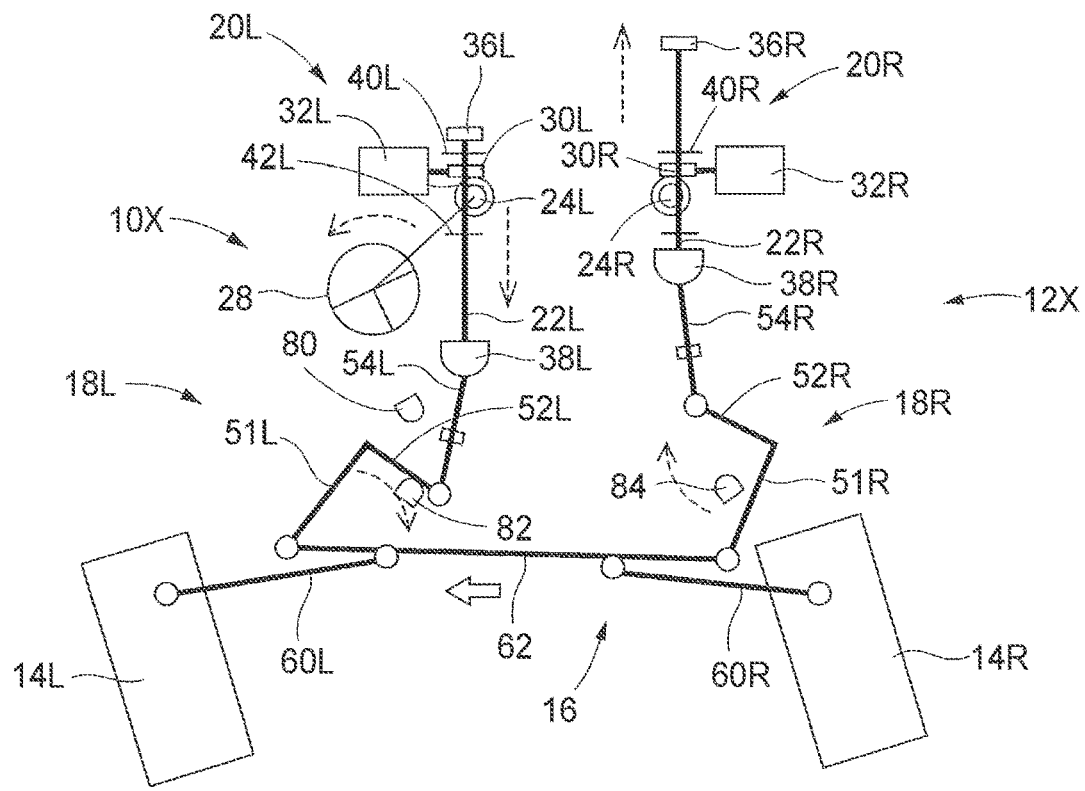
FIG. 5 is a plan view conceptually showing an operation state (left turn state) in the power steering system.

As shown in FIG. 5, when the steering wheel 28 is operated to turn the right and left front wheels 14R, 14L to the left, an operating torque added via the steering wheel 28 and an assist torque added by the assist motor 32L are added to the pinion gear 24L in the operating-side wheel steering mechanism 10X. Thus, the rack bar 22L is moved in a direction to approach the coupling mechanism 16 (hereinafter, which may be referred to as rearward direction), and the link mechanism 18L is pivoted to the right. In the nonoperating-side wheel steering mechanism 12X, the pinion gear 24R is rotated by an assist torque added by the assist motor 32R, moved in a direction in which the rack bar 22R moves away from the coupling mechanism 16 (hereinafter, which may be referred to as forward direction), and the link mechanism 18R is pivoted to the right. Thus, the coupling rod 62 is moved to the left, and the right and left front wheels 14R, 14L are turned to the left.

In the operating-side wheel steering mechanism 10X, when the first link member 50L contacts with the stop member 82, a right pivot of the link mechanism 18L is limited, and rearward movement of the rack bar 22L is limited. Leftward movement of the coupling rod 62 is limited, and a left turn of the right and left front wheels 14R, 14L is limited. The right and left front wheels 14R, 14L are not further turned to the left. A left turn limit of the right and left front wheels 14R, 14L is determined, and a maximum value of a left turning angle is determined.

In this way, the first link member 50L contacts with the stop member 82 in the operating-side wheel steering mechanism 10X including the steering wheel 28. Therefore, this contact is appropriately transmitted to the steering wheel 28 via the second link member 54L, the rack bar 22L, the pinion gear 24L, and the steering shaft 26. The driver is able to appropriately recognize limitation of a turn of the right and left front wheels 14R, 14L. The driver is expected not to perform the further steering operation of the steering wheel 28. Thus, unnecessary consumption of energy in the assist motors 32R, 32L is reduced.

Figure 6:
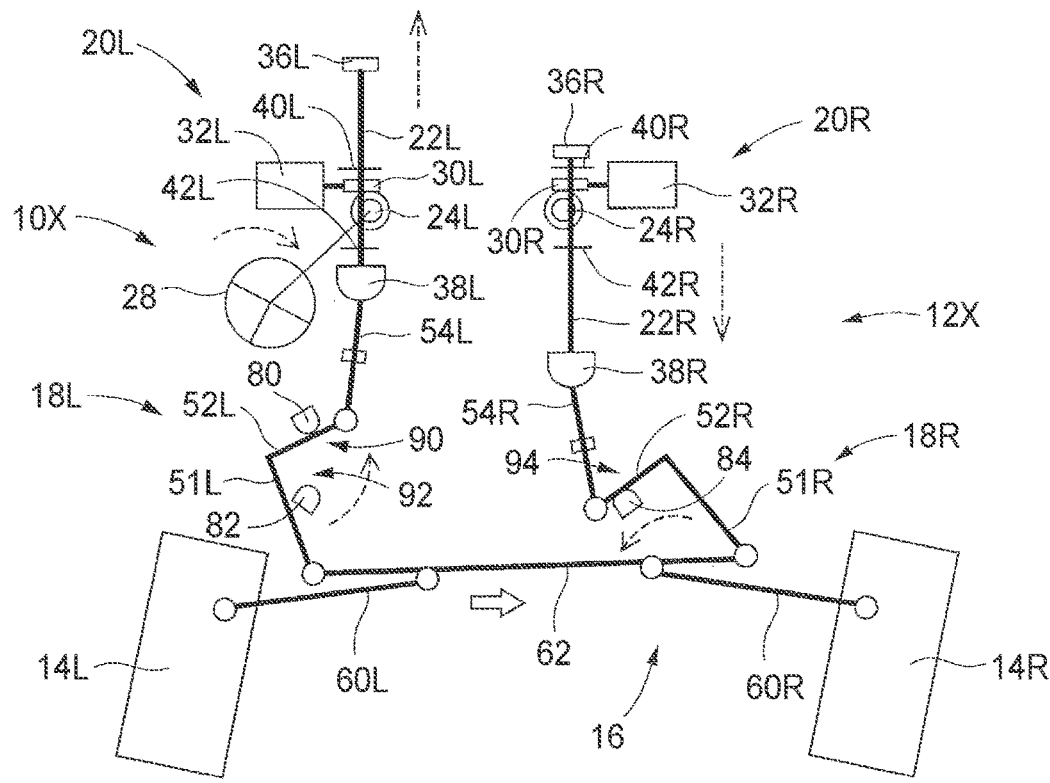
FIG. 6 is a plan view conceptually showing another operation state (right turn state) in the power steering system.

As shown in FIG. 6, when the steering wheel 28 is operated to turn the right and left front wheels 14R, 14L to the right, the pinion gear 24L is rotated by the operating torque of the driver and the assist torque of the assist motor 32L, the rack bar 22L is moved forward, and the link mechanism 18L is pivoted to the left in the operating-side wheel steering mechanism 10X. In the nonoperating-side wheel steering mechanism 12X, the rack bar 22R is moved rearward by the assist motor 32R, with the result that the link mechanism 18R is pivoted to the left. Thus, the coupling rod 62 is moved to the right, and the right and left front wheels 14R, 14L are turned to the right.

When the first link member 50L contacts with the stop member 80 in the operating-side wheel steering mechanism 10X and the first link member 50R contacts with the stop member 84 in the nonoperating-side wheel steering mechanism 12X, a pivot of the link mechanisms 18R, 18L to the left is limited, and forward movement of the rack bar 22L and rearward movement of the rack bar 22R are limited. Rightward movement of the coupling rod 62 is limited, and a right turn of the right and left front wheels 14R, 14L is limited. The right and left front wheels 14R, 14L are not further turned to the right. A right turn limit of the right and left front wheels 14R, 14L is determined, and a maximum value of a right turning angle is limited.

Since the first link member 50L contacts with the stop member 80 in the operating-side wheel steering mechanism 10X, this contact is appropriately transmitted to the steering wheel 28, and the driver is able to appropriately recognize that a right turn of the right and left front wheels 14R, 14L is limited. The driver is expected not to perform the further steering operation of the steering wheel 28. Thus, consumption of energy in the assist motors 32R, 32L is reduced.

In the nonoperating-side wheel steering mechanism 12X, when the first link member 50R contacts with the stop member 84, rearward movement of the rack bar 22R is limited. If no stop member 84 is provided, when the steering wheel 28 is operated even after a right turn of the right and left front wheels 14R, 14L is limited, the assist motors 32R, 32L are continuously controlled based on an operating torque. On the other hand, since the rack bar 22R is coupled to the link mechanism 18R, the rack bar 22R can be moved rearward by the assist motor 32R, and the link mechanism 18R can be forcibly pivoted while the second link member 54R and the first link member 50R are bent. In addition, a large load is added to the rack bar 22R, the second link member 54R, the first link member 50R, and the like.

In contrast, with the stop member 84, the first link member 50R contacts with the stop member 84, and rearward movement of the rack bar 22R is limited. Thus, a pivot of the first link member 50R and the second link member 54R while the first link member 50R and the second link member 54R are bent is appropriately avoided. With the stop member 84, a pivot of the first link member 50R is limited at a location close to the pinion gear 24R. As a result, a load added to the assist motor 32R steeply increases, and an actual assist force of the assist motor 32R can be greater than or equal to a target assist force. Thus, the assist motor 32R may be stopped or an assist force may be reduced. In this case, a load (for example, bending stress or the like) added to the rack bar 22R, the second link member 54R, and the like are appropriately reduced.

As described above, when the first link member 50L contacts with the stop member 80, limitation of a right turn of the right and left front wheels 14R, 14L is appropriately transmitted to the driver, so the driver is expected to finish operation of the steering wheel 28 in a direction to turn the right and left front wheels 14R, 14L to the right. In this sense as well, bending stress added to the rack bar 22R and the like is reduced, so the life is extended.

On the other hand, the location of each of the stop members 80, 82, 84 that limit a pivot of the first link members 50R, 50L is easily adjusted. Therefore, the locations of the stop members 80, 84 can be adjusted such that, as the first link member 50L contacts with the stop member 80, the first link member 50R contacts with the stop member 84.

In the present embodiment, before the front contact portion 36L contacts with the front stopper 40L in the operating-side wheel steering mechanism 10X, and before the ball joint 38R contacts with the rear stopper 42R in the nonoperating-side wheel steering mechanism 12X, the first link member 50L contacts with the stop member 82. Before the front contact portion 36R contacts with the front stopper 40R in the nonoperating-side wheel steering mechanism 12X, and before the ball joint 38L contacts with the rear stopper 42L in the operating-side wheel steering mechanism 10X, the first link member 50L contacts with the stop member 80 in the operating-side wheel steering mechanism 10X, and the first link member 50R contacts with the stop member 84 in the nonoperating-side wheel steering mechanism 12X. For this reason, substantially, the front stoppers 40R, 40L and the rear stoppers 42R, 42L do not function as stoppers. Therefore, the front stoppers 40R, 40L and the rear stoppers 42R, 42L presumably have the function of preventing a slip off although not indispensable.

From above, in the present embodiment, the stop members 80, 82 may be regarded as an operating-side stopper and an operating-side pivot stopper, and the stop member 84 may be regarded as a nonoperating-side stopper and a nonoperating-side pivot stopper.

Second Embodiment

In a power steering system for a vehicle according to a second embodiment, movement of the rack bar 22L of an operating-side wheel steering mechanism 10Y is limited, and a pivot of the link mechanism 18R is limited.

Figure 7:
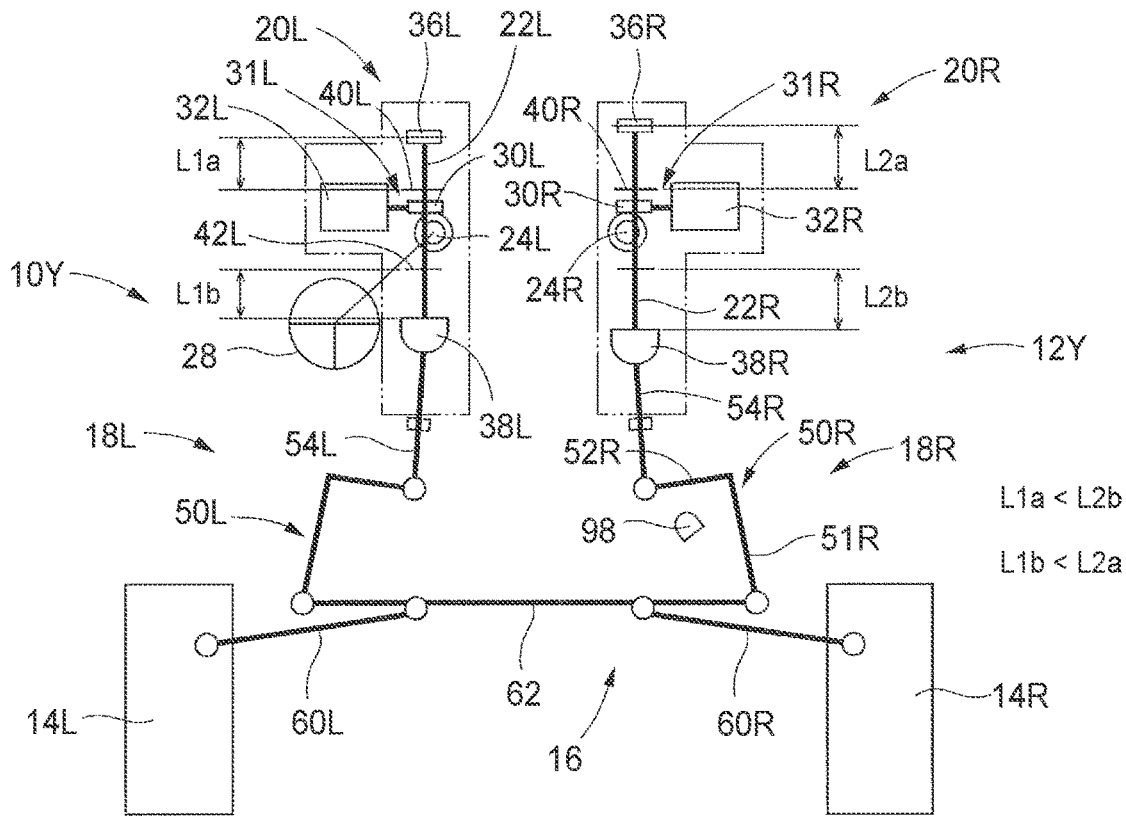
FIG. 7 is a plan view conceptually showing a power steering system for a vehicle according to a second embodiment of the present disclosure.

As shown in FIG. 7, in the power steering system, a distance L1a between the front stopper 40L and the front contact portion 36L in the operating-side wheel steering mechanism 10Y in a state where the right and left front wheels 14R, 14L are in a neutral position is shorter than a distance L2b between the rear stopper 42R and the ball joint 38R in a nonoperating-side wheel steering mechanism 12Y (L1a<L2b), and a distance L1b between the rear stopper 42L and the ball joint 38L in the operating-side wheel steering mechanism 10Y is shorter than a distance L2a between the front stopper 40R and the front contact portion 36R in the nonoperating-side wheel steering mechanism 12Y (L1b<L2a). The state where the right and left front wheels 14R, 14L are in a neutral position is a state of the right and left front wheels 14R, 14L when the vehicle is in a straight-ahead state (it can be assumed that the turning angle is zero). For this reason, in the nonoperating-side wheel steering mechanism 12Y, the front contact portion 36R does not contact with the front stopper 40R, and the ball joint 38R does not contact with the rear stopper 42R.

In the nonoperating-side wheel steering mechanism 12Y, a stop member 98 is provided at a location at which the stop member 98 faces the first link member 50R of the link mechanism 18R on a vehicle body-side member, and a pivot of the link mechanism 18R is limited. In the present embodiment, the stop member 98 is mounted on the rear side of the second arm portion 52R, that is, the stop member 98 is mounted at a location at which the first link member 50R contacts with the stop member 98 in the nonoperating-side wheel steering mechanism 12Y as the ball joint 38L of the rack bar 22L contacts with the rear stopper 42L in the operating-side wheel steering mechanism 10Y.

Figure 8:
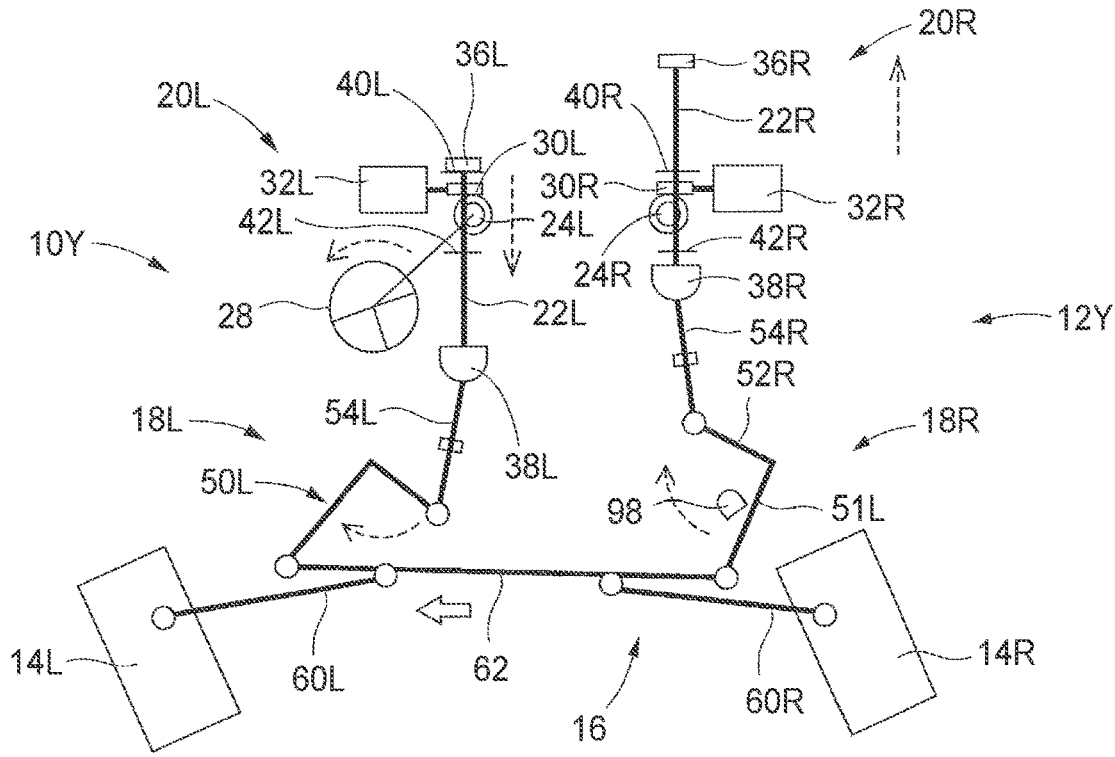
FIG. 8 is a plan view conceptually showing an operation state (left turn state) in the power steering system.

When, for example, the steering wheel 28 is operated to turn the right and left front wheels 14R, 14L to the left, the pinion gear 24L is rotated by the operating torque and the assist torque generated by the assist motor 32L in the operating-side wheel steering mechanism 10Y, and the rack bar 22L is moved rearward, as shown in FIG. 8. In the nonoperating-side wheel steering mechanism 12Y, the pinion gear 24R is rotated by the assist torque, and the rack bar 22R is moved forward. Both the link mechanisms 18R, 18L are pivoted to the right, the coupling rod 62 is moved to the left, and the right and left front wheels 14R, 14L are turned to the left.

In the operating-side wheel steering mechanism 10Y, when the front contact portion 36L contacts with the front stopper 40L, rearward movement of the rack bar 22L is limited, and a pivot of the link mechanism 18L is limited. Leftward movement of the coupling rod 62 is limited, and a turn of the right and left front wheels 14R, 14L is limited. The right and left front wheels 14R, 14L are not further turned to the left. In this way, since the front contact portion 36L contacts with the front stopper 40L in the operating-side wheel steering mechanism 10Y, limitation of a left turn of the right and left front wheels 14R, 14L can be appropriately transmitted to the steering wheel 28.

Figure 9:
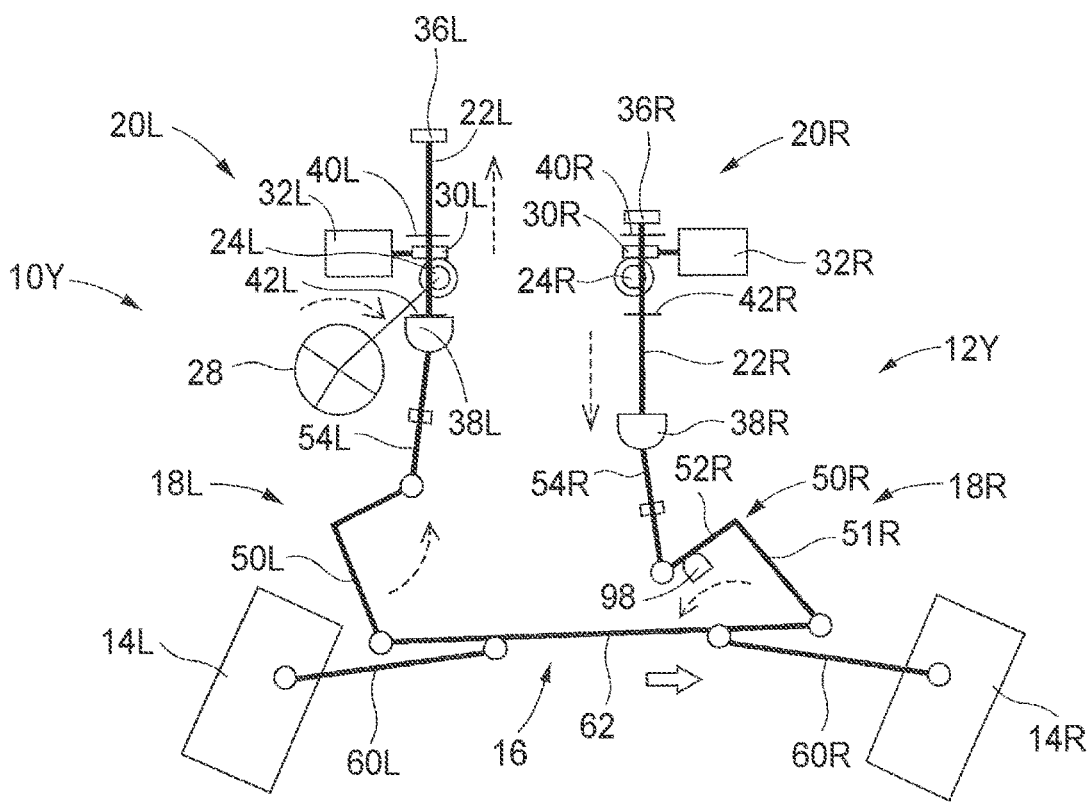
FIG. 9 is a plan view conceptually showing another operation state (right turn state) in the power steering system.

When the steering wheel 28 is operated to turn the right and left front wheels 14R, 14L to the right, the pinion gear 24L is rotated by the operating torque and the assist torque generated by the assist motor 32L in the operating-side wheel steering mechanism 10Y, and the rack bar 22L is moved forward, as shown in FIG. 9. In the nonoperating-side wheel steering mechanism 12Y, the pinion gear 24R is rotated by the assist motor 32R, and the rack bar 22R is moved rearward. The link mechanisms 18R, 18L are pivoted to the left, the coupling rod 62 is moved to the right, and the right and left front wheels 14R, 14L are turned to the right.

The ball joint 38L contacts with the rear stopper 42L in the operating-side wheel steering mechanism 10Y, and the first link member 50R contacts with the stop member 98 in the nonoperating-side wheel steering mechanism 12Y. Thus, a right turn of the right and left front wheels 14R, 14L is limited. Since the ball joint 38L contacts with the rear stopper 42L in the operating-side wheel steering mechanism 10Y, limitation of a right turn of the right and left front wheels 14R, 14L can be appropriately transmitted to the steering wheel 28.

Since the first link member 50R contacts with the stop member 98 in the nonoperating-side wheel steering mechanism 12Y, rearward movement of the rack bar 22R is limited, bending of the first link member 50R and the second link member 54R is limited, and a forcible pivot of the link mechanism 18R is limited. A load added to the rack bar 22R and the like is reduced.

On the other hand, due to variations and the like of the rack bars 22R, 22L, it is difficult to set the locations of the front stoppers 40R, 40L and the rear stoppers 42R, 42L such that the ball joint 38R contacts with the rear stopper 40R in the nonoperating-side wheel steering mechanism 12Y as the front contact portion 36L contacts with the front stopper 40L in the operating-side wheel steering mechanism 10Y and the front contact portion 36R contacts with the front stopper 40R in the nonoperating-side wheel steering mechanism 12Y as the ball joint 38L contacts with the rear stopper 42L in the operating-side wheel steering mechanism 10Y. For this reason, even when the locations are set such that the ball joint 38R contacts with the rear stopper 42R in the nonoperating-side wheel steering mechanism 12Y as the front contact portion 36L contacts with the front stopper 40L in the operating-side wheel steering mechanism 10Y and the front contact portion 36R contacts with the front stopper 40R in the nonoperating-side wheel steering mechanism 12Y as the ball joint 38L contacts with the rear stopper 42L in the operating-side wheel steering mechanism 10Y, deviations occur among them. Therefore, it is difficult to appropriately determine a turning angle in the case where a right turn and a left turn of the right and left front wheels 14R, 14L are limited. In contrast, when the number of stoppers that limit a turn of the right and left front wheels 14R, 14L is one, a turning angle in the case where a turn is limited is appropriately determined.

In the present embodiment, the front stopper 40L and the rear stopper 42L may be respectively regarded as an operating-side stopper and an operating-side movement stopper, and the stop member 98 may be regarded as a nonoperating-side stopper and a pivot stopper.

Third Embodiment

In a power steering system for a vehicle according to a third embodiment, movement of the rack bar 22L of an operating-side wheel steering mechanism 10Z and movement of the rack bar 22R of a nonoperating-side wheel steering mechanism 12Z are limited, and a pivot of the link mechanism 18L is limited.

Figure 10:
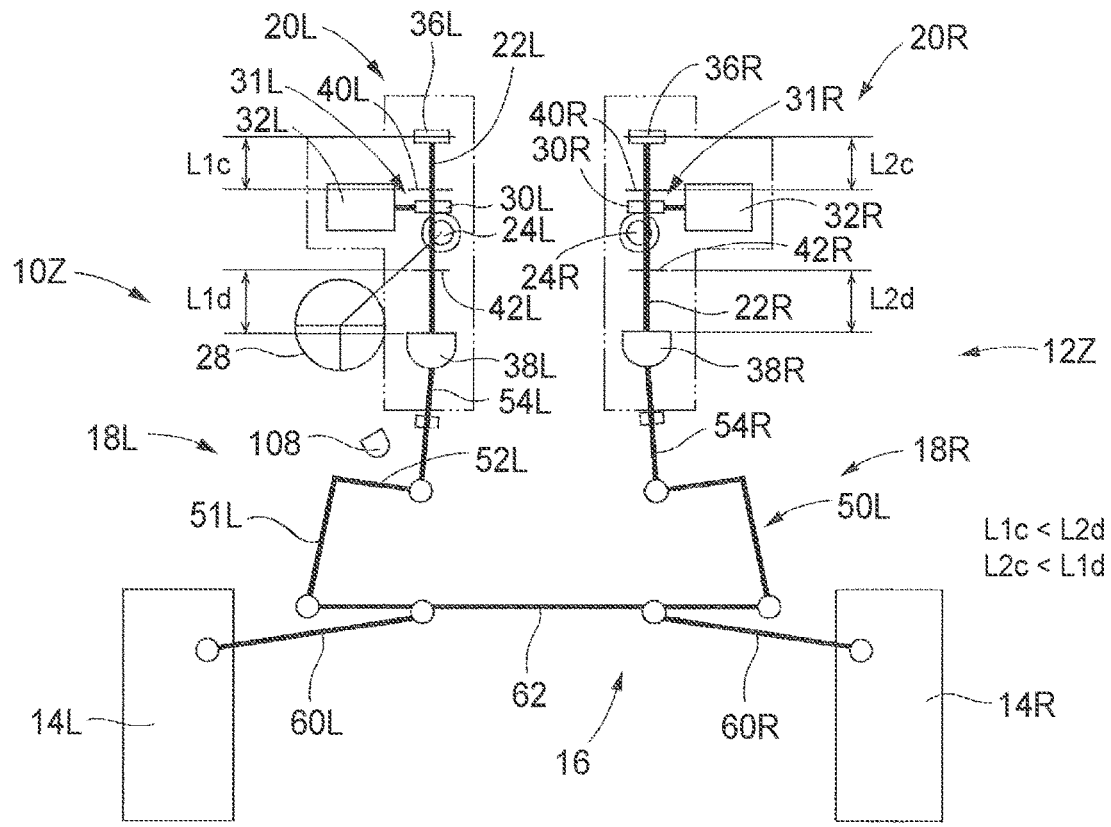
FIG. 10 is a plan view conceptually showing a power steering system for a vehicle according to a third embodiment of the present disclosure.

As shown in FIG. 10, a distance $L1c$ between the front contact portion 36L and the front stopper 40L in the operating-side wheel steering mechanism 10Z in the case where the right and left front wheels 14R, 14L are in the neutral position is shorter than a distance $L2d$ between the ball joint 38R and the rear stopper 42R in the nonoperating-side wheel steering mechanism 12Z ($L1c<L2d$), and a distance $L2c$ between the front contact portion 36R and the front stopper 40R in the nonoperating-side wheel steering mechanism 12Z is shorter than a distance $L1d$ between the ball joint 38L and the rear stopper 42L in the operating-side wheel steering mechanism 10Z ($L2c<L1d$).

In the operating-side wheel steering mechanism 10Z, a stop member 108 is provided at a location at which the stop member 108 faces the first link member 50L on a vehicle body-side member.

Figure 11:
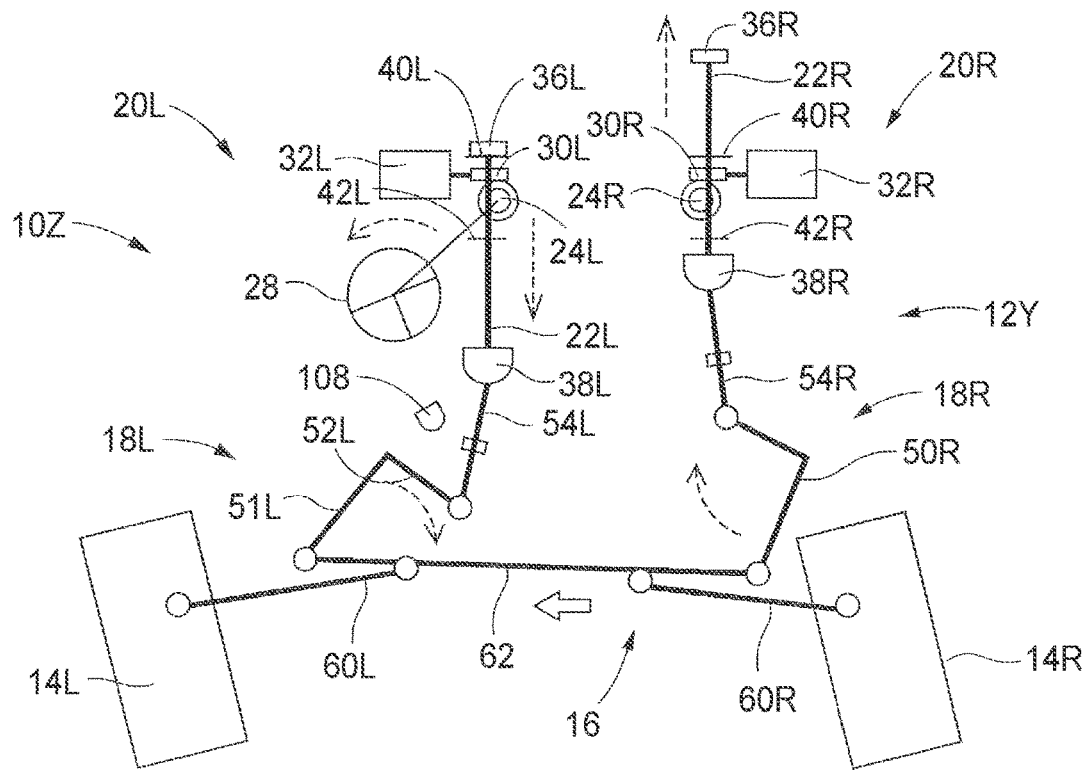
FIG. 11 is a plan view conceptually showing an operation state (left turn state) in the power steering system.

As shown in FIG. 11, when the steering wheel 28 is operated to turn the right and left front wheels 14R, 14L to the left, the assist motors 32R, 32L are operated, the rack bar 22L is moved rearward, and the rack bar 22R is moved forward. The link mechanisms 18R, 18L are pivoted to the right, the coupling rod 62 is moved to the left, and the right and left front wheels 14R, 14L are turned to the left. A left turn of the right and left front wheels 14R, 14L is limited by the contact of the front contact portion 36L with the front stopper 40L in the operating-side wheel steering mechanism 10Z. Limitation of a turn of the right and left front wheels 14R, 14L can be appropriately transmitted to the steering wheel 28.

Figure 12:
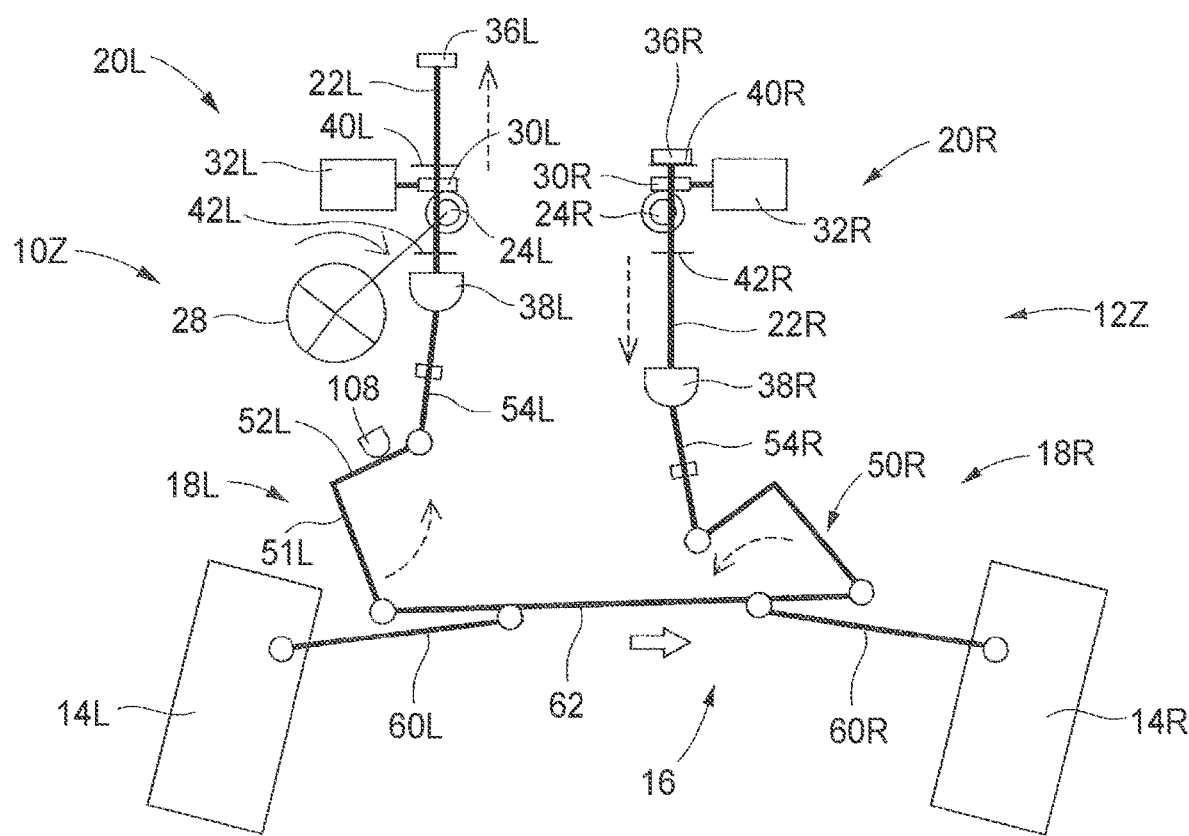
FIG. 12 is a plan view conceptually showing another operation state (right turn state) in the power steering system.

When the steering wheel 28 is operated to turn the right and left front wheels 14R, 14L to the right, the assist motors 32R, 32L are operated, the rack bar 22L is moved forward, and the rack bar 22R is moved rearward, as shown in FIG. 12. The link mechanisms 18R, 18L are pivoted to the left, the coupling rod 62 is moved to the right, and the right and left front wheels 14R, 14L are turned to the right. A right turn of the right and left front wheels 14R, 14L is limited by the contact of the front contact portion 36R with the front stopper 40R in the nonoperating-side wheel steering mechanism 12Z and the contact of the first link member 50L with the stop member 108 in the operating-side wheel steering mechanism 10Z.

Since the first link member 50L contacts with the stop member 108 in the operating-side wheel steering mechanism 10Z, limitation of a right turn of the right and left front wheels 14R, 14L can be appropriately transmitted to the steering wheel 28.

Even when the steering wheel 28 is steered to the left or steered to the right, the front contact portion 36R contacts with the front stopper 36R or the front contact portion 36L contacts with the front stopper 40L. As a result, even when the assist motor 32R or the assist motor 32L is operated after a turn of the right and left front wheels 14R, 14L is limited, rearward movement of the rack bar 22R or rearward movement of the rack bar 22L is prevented, so a load added to the rack bars 22R, 22L and the like is reduced.

In the present embodiment, the front stopper 40L may be regarded as an operating-side stopper and an operating-side movement stopper, and the stop member 108 may be regarded as an operating-side stopper and an operating-side pivot stopper. The front stopper 40R may be regarded as a nonoperating-side stopper and a nonoperating-side movement stopper.

The operating-side wheel steering mechanism 10 may be provided on the right side, and the nonoperating-side wheel steering mechanism 12 may be provided on the left side. The operating-side wheel steering mechanism 10 and the nonoperating-side wheel steering mechanism 12 may be provided on the rear side of the coupling mechanism 16.

In the operating-side wheel steering mechanism 10, the electric assist device 31L is not indispensable. For example, the motor ECUs 70, 72 may be provided in common to the assist motor 32R and the assist motor 32L or may be configured to control the assist motors 32R, 32L in consideration of a travel speed or the like of the vehicle in addition to an operating torque. Other than that, the present disclosure may be implemented in various forms with various modifications or improvements based on the knowledge of persons skilled in the art, other than the above-described embodiments.

(1) A power steering system for a vehicle includes a pair of wheel steering mechanisms configured to turn a pair of steered wheels of the vehicle, and a coupling mechanism that couples the pair of steered wheels and that couples the pair of wheel steering mechanisms. The pair of wheel steering mechanisms includes an operating-side wheel steering mechanism and a nonoperating-side wheel steering mechanism. The operating-side wheel steering mechanism includes a drive shaft coupled to one end of the coupling mechanism and extending in an axial direction, and a steering operation member engaged with the drive shaft. The nonoperating-side wheel steering mechanism includes a drive shaft coupled to the other end of the coupling mechanism and extending in an axial direction, and an electric assist device engaged with the drive shaft. The operating-side wheel steering mechanism includes at least two operating-side stoppers configured to limit a right turn and a left turn of the pair of steered wheels.

The operating-side wheel steering mechanism includes at least two operating-side stoppers. Alternatively, the operating-side wheel steering mechanism may include three or more operating-side stoppers.

The operating-side wheel steering mechanism and the nonoperating-side wheel steering mechanism are provided apart from each other in the right and left direction of the vehicle. The operating-side wheel steering mechanism may be provided on the left side, and the nonoperating-side wheel steering mechanism may be provided on the right side. Alternatively, the operating-side wheel steering mechanism may be provided on the right side, and the operating-side wheel steering mechanism may be provided on the left side.

(2) In the power steering system, the operating-side wheel steering mechanism may include a link mechanism that couples the coupling mechanism and the drive shaft, and the at least two operating-side stoppers may include two operating-side pivot stoppers each configured to be able to contact with a link member that is a component of the link mechanism and configured to limit a pivot of the link member resulting from movement of the drive shaft.

(3) In the power steering system, the operating-side wheel steering mechanism may include a link mechanism that couples the coupling mechanism and the drive shaft, and the at least two operating-side stoppers may include an operating-side movement stopper configured to be able to contact with the drive shaft and configured to limit movement of the drive shaft in a direction to approach the coupling mechanism, and an operating-side pivot stopper configured to be able to contact with a link member that is a component of the link mechanism and configured to limit a pivot of the link member resulting from movement of the drive shaft in a direction to separate from the coupling mechanism.

(4) In the power steering system, the at least two operating-side stoppers may include two operating-side movement stoppers each configured to be able to contact with the drive shaft and configured to limit movement of the drive shaft.

(5) In the power steering system, the nonoperating-side wheel steering mechanism may include at least one nonoperating-side stopper configured to limit any one of a right turn and a left turn of the pair of steered wheels.

The nonoperating-side wheel steering mechanism includes at least one nonoperating-side stopper. Alternatively, the nonoperating-side wheel steering mechanism may include two or more nonoperating-side stoppers. The power steering system includes at least three stoppers.

The nonoperating-side stopper is configured to limit a turn of the pair of steered wheels at the same time with one of the two operating-side stoppers and may have a function of suppressing movement of the drive shaft in addition to the function of limiting a turn.

(6) In the power steering system, the nonoperating-side wheel steering mechanism may include a link mechanism that couples the coupling mechanism and the drive shaft, and the at least one nonoperating-side stopper may include a nonoperating-side pivot stopper configured to be able to contact with a link member that is a component of the link mechanism and configured to limit a pivot of the link member resulting from movement of the drive shaft in a direction to approach the coupling mechanism.

In the first to third embodiments, the first link members 50R, 50L may be regarded as the link members.

(7) In the power steering system, the at least one nonoperating-side stopper may include a nonoperating-side movement stopper configured to be able to contact with the drive shaft and configured to limit movement of the drive shaft in a direction to approach the coupling mechanism.

(8) In the vehicle power steering system, the operating-side wheel steering mechanism may be provided on any one of a right side and a left side of the vehicle, the nonoperating-side wheel steering mechanism may be provided on the other one of the right side and the left side of the vehicle, and the at least one nonoperating-side stopper may be configured to limit a turn of the pair of steered wheels to the other side.

(9) In the vehicle power steering system, the operating-side wheel steering mechanism may further include an electric assist device engaged with the drive shaft.

(10) In the vehicle power steering system, the coupling mechanism may include a pair of tie rods respectively coupled to the steered wheels, and a coupling rod coupling the pair of tie rods.

The pair of wheel steering mechanisms may be respectively coupled to the pair of tie rods or may be coupled to the coupling rod.

(11) A power steering system for a vehicle includes a pair of wheel steering mechanisms provided apart from each other in a right and left direction of the vehicle and configured to turn a pair of steered wheels, and a coupling mechanism that couples the pair of steered wheels and that couples the pair of wheel steering mechanisms. The pair of wheel steering mechanisms include an operating-side wheel steering mechanism and a nonoperating-side wheel steering mechanism. The operating-side wheel steering mechanism is provided on one side in the right and left direction of the vehicle. The operating-side wheel steering mechanism includes a drive shaft coupled to one end of the coupling mechanism and extending in an axial direction, and a steering operation member engaged with the drive shaft. The nonoperating-side wheel steering mechanism is provided on the other side in the right and left direction of the vehicle. The nonoperating-side wheel steering mechanism includes a drive shaft coupled to the other end of the coupling mechanism and extending in an axial direction, and an electric assist device engaged with the drive shaft. The power steering system includes at least one first stopper configured to, when the pair of steered wheels is turned to one side in the right and left direction, limit a turn of the pair of steered wheels, and at least two second stoppers configured to, when the pair of steered wheels is turned to the other side in the right and left direction, limit a turn of the pair of steered wheels.

The above power steering system may include the characteristics described in any one of (1) to (10).

One of the at least one first stopper is an operating-side stopper provided in the operating-side wheel steering mechanism, and two of the at least two second stoppers are an operating-side stopper provided in the operating-side wheel steering mechanism and a nonoperating-side stoppers provided in the nonoperating-side wheel steering mechanism.

What is claimed is:

1. A power steering system for a vehicle, the power steering system comprising:
    a pair of wheel steering mechanisms respectively configured to turn a pair of steered wheels of the vehicle; and
    a coupling mechanism configured to couple the pair of steered wheels and couple the pair of wheel steering mechanisms, wherein:
    the pair of wheel steering mechanisms includes an operating-side wheel steering mechanism and a nonoperating-side wheel steering mechanism;
    the operating-side wheel steering mechanism is provided to be coupled to one end of the coupling mechanism, the operating-side wheel steering mechanism including a first drive shaft extending in an axial direction and a steering operation member engaged with the first drive shaft;
    the nonoperating-side wheel steering mechanism is provided to be coupled to the other end of the coupling mechanism, the nonoperating-side wheel steering mechanism including a second drive shaft extending in an axial direction and an electric assist device engaged with the second drive shaft;
    the operating-side wheel steering mechanism includes at least two operating-side stoppers respectively configured to limit a right turn and a left turn of the pair of steered wheels;
    the nonoperating-side wheel steering mechanism includes at least one nonoperating-side stopper configured to limit any one of a right turn and a left turn of the pair of steered wheels;
    the operating-side wheel steering mechanism includes a first link mechanism coupling the coupling mechanism and the first drive shaft;
    the at least two operating-side stoppers includes
        at least one operating-side movement stopper configured to be contactable with the first drive shaft and configured to limit movement of the first drive shaft in a direction to approach or separate the coupling mechanism, and
        at least one operating-side pivot stopper configured to be contactable with a first link member that is a component of the first link mechanism and configured to limit a pivot of the first link member resulting from movement of the first drive shaft;
    the nonoperating-side wheel steering mechanism includes a second link mechanism coupling the coupling mechanism and the second drive shaft; and
    the at least one nonoperating-side stopper includes a nonoperating-side pivot stopper configured to be contactable with a second link member that is a component of the link mechanism and configured to limit a pivot of the link member resulting from movement of the drive shaft in a direction to approach the coupling mechanism.

2. The power steering system according to claim 1, wherein:
    the at least two operating-side stoppers include two operating-side pivot stoppers each configured to be contactable with the first link member and configured to limit a pivot of the first link member resulting from movement of the first drive shaft.

3. The power steering system according to claim 1, wherein the at least two operating-side stoppers include two operating-side movement stoppers each configured to be contactable with the first drive shaft and configured to limit movement of the first drive shaft.

4. The power steering system according to claim 1, wherein the at least one nonoperating-side stopper includes a nonoperating-side movement stopper configured to be contactable with the second drive shaft and configured to limit movement of the second drive shaft in a direction to approach the coupling mechanism.

5. The power steering system according to claim 1, wherein the operating-side wheel steering mechanism further includes an electric assist device engaged with the first drive shaft.

6. A power steering system for a vehicle, the power steering system comprising:
    a pair of wheel steering mechanisms provided so as to be spaced apart in a right and left direction of the vehicle and respectively configured to turn a pair of steered wheels of the vehicle;
    a coupling mechanism configured to couple the pair of steered wheels and couple the pair of wheel steering mechanisms;
    at least one first stopper configured to, in a case where the pair of steered wheels is turned to one side in the right and left direction, limit a turn of the pair of steered wheels; and
    at least two second stoppers configured to, in a case where the pair of steered wheels is turned to the other side in the right and left direction, limit a turn of the pair of steered wheels, wherein:
    the pair of wheel steering mechanisms includes an operating-side wheel steering mechanism and a nonoperating-side wheel steering mechanism;
    the operating-side wheel steering mechanism is provided on the one side in the right and left direction of the vehicle to be coupled to one end of the coupling mechanism, the operating-side wheel steering mechanism including a first drive shaft extending in an axial direction and a steering operation member engaged with the first drive shaft;
    the nonoperating-side wheel steering mechanism is provided on the other side in the right and left direction of the vehicle to be coupled to the other end of the coupling mechanism, the nonoperating-side wheel steering mechanism including a second drive shaft extending in an axial direction and an electric assist device engaged with the second drive shaft;

the operating-side wheel steering mechanism includes a first link mechanism coupling the coupling mechanism and the first drive shaft;

the at least one first stopper includes a first operating-side pivot stopper configured to be contactable with a first link member that is a component of the first link mechanism and configured to limit a pivot of the first link member resulting from movement of the first drive shaft;

the nonoperating-side wheel steering mechanism includes a second link mechanism coupling the coupling mechanism and the second drive shaft; and the at least two second stoppers include
- a second operating-side pivot stopper configured to be contactable with the first link member and configured to limit a pivot of the first link member resulting from movement of the first drive shaft, and
- a nonoperating-side pivot stopper configured to be contactable with a second link member that is a component of the second link mechanism and configured to limit a pivot of the second link member resulting from movement of the second drive shaft in a direction to approach the coupling mechanism.

* * * * *